UNITED STATES PATENT OFFICE.

HARRY BICK, OF YONKERS, NEW YORK.

CHEESE-CUTTER.

973,849.  Specification of Letters Patent.  Patented Oct. 25, 1910.

Application filed August 24, 1910. Serial No. 578,783.

*To all whom it may concern:*

Be it known that I, HARRY BICK, a citizen of the United States, residing at Yonkers, county of Westchester, and State of New York, have invented new and useful Improvements in Cheese-Cutters, of which the following is a specification.

This invention relates to an apparatus of novel construction more particularly intended for cutting cheese though it may also be used for cutting other articles. Large and hard cheeses, such as Italian cheeses, are by the retailers frequently sold in sections, and the object of the invention is to provide means for readily and accurately dividing the cheese into either quarters or halves as may be desired.

In the accompanying drawing: Figure 1 is a side elevation partly in section of my improved cheese cutter; Fig. 2 a horizontal section on line 2—2, Fig. 1; Fig. 3 a detail of the knife-retaining catch, and Fig. 4 a detail of part of the cutter head.

A circular wooden base plate 10, is provided on its upper side with a series of numbered concentric circles 11, adapted to center around cheeses of different sizes. Plate 10 is encompassed by a metal band 12, having apertured lugs 13, by means of which the device may be secured to a table or other support. From diametrically opposite points of band 12, extend upwardly the two shanks of an inverted U-shaped frame 14. The cross bar of this frame is provided with a nut 15, which engages a screw spindle 16, having hand wheel 17, and centered above plate 10. A cruciform cutter head A, is operatively connected to spindle 16 by means of a pair of intersecting perforated straps 18, which are riveted to the cutter head, and encompass the lower end of the spindle, to which they are held by a nut 19.

The cruciform cutter head A, is composed of or comprises four radially projecting arms 20 diverging at right angles, and each provided with a lower downwardly opening longitudinal groove 21, which is dovetailed in cross section. To each arm 20 is adapted to be removably connected, a knife or cutting blade 22, having a tapering heel 23, adapted to be slipped into groove 21. A spring catch 24 riveted to each arm 20 and overlapping the heel 23 of the inserted knife, prevents the latter from becoming accidentally detached.

Two diametrically disposed arms 20 are provided at their ends with slotted guides 25, engaging the shanks of frame 14, and serving to guide the cutter head during its ascent or descent. Guides 25, are arranged laterally from arms 20 and at opposite sides thereof, so that they may freely engage frame 14, and will at the same time leave the ends of grooves 21 unobstructed.

The operation of the device will be readily understood. When all four knives are inserted, the cheese gaged upon plate 10 will be divided into four quadrants upon a descent of the cutter head. If two knives are inserted at right angles, a single quadrant will be cut off, while with two knives set in alinement, the cheese will be divided into two equal halves. It will thus be seen that the invention provides means for subdividing the cheese into sections of suitable sizes in a quick, convenient and accurate manner.

I claim:

1. A cheese cutter provided with a reciprocative cutter head having a cruciform groove, a series of blades having heels adapted to removably engage said groove, and catches carried by the cutter head and adapted to engage the blades.

2. A cheese cutter provided with a base plate, a frame projecting upwardly therefrom, a screw spindle tapped into the frame, a cruciform cutter head carried by the spindle, guides secured to the cutter head and engaging the frame, and blades removably secured to the cutter head.

3. A cheese cutter provided with a base plate, a frame projecting upwardly therefrom, a screw spindle tapped into the frame, a cruciform cutter head carried by the spindle, guides secured to opposite sides of a pair of diametrically disposed arms of the cutter head and engaging the frame, and blades removably secured to the cutter head.

4. A cheese cutter provided with a base plate having a series of concentric circles represented thereon, a frame projecting upwardly from the base plate, a screw spindle tapped into the frame, a cruciform cutter head carried by the spindle, guides secured to the cutter head and engaging the frame, and blades removably secured to the cutter head.

HARRY BICK.

Witnesses:
 FRANK V. BRIESEN,
 KATHERYNE KOCH.